United States Patent Office 3,409,579
Patented Nov. 5, 1968

3,409,579
FOUNDRY BINDER COMPOSITION COMPRISING BENZYLIC ETHER RESIN, POLYISOCYANATE, AND TERTIARY AMINE
Janis Robins, St. Paul, Minn., assignor to Ashland Oil & Refining Company, Ashland, Ky., a corporation of Kentucky
No Drawing. Continuation-in-part of application Ser. No. 569,106, Aug. 1, 1966. This application May 2, 1967, Ser. No. 635,382
22 Claims. (Cl. 260—30.4)

ABSTRACT OF THE DISCLOSURE

A binder composition particularly suited for foundry aggregates is obtained by admixing a phenolic resin with a polyisocyanate and thereafter promoting the cross-linking of the mixture with a tertiary amine.

---

The present invention relates to binder compositions and to methods for curing such binder compositions. In another aspect, the present invention relates to binder compositions useful in the foundry art for making cores which harden at room temperature. In still another aspect, the present invention relates to combination of a foundry aggregate such as sand and a binder based on phenolic resins and polyisocyanates which, on being formed into a coherent mass with the aggregate, is capable of being cured at room temperature, preferably by the use of a gaseous curing agent. This application is a continuation-in-part of application Ser. No. 569,106 filed Aug. 1, 1966.

In the foundry art, cores for use in making metal castings are normally prepared from mixture of an aggregate material, such as sand, which has been combined with a binding amount of a polymerizable or curable binder. Frequently, minor amounts of other materials are also included in these mixtures, e.g. iron oxide, ground flax fibers, and the like. The binder permits such a foundry mix to be molded or shaped into the desired form and thereafter cured to form a self-supporting structure.

Typically, sand is used as the aggregate material. After the sand and binder have been mixed, the resulting foundry sand mix is rammed, blown, or otherwise introduced into a pattern, thereby assuming the shape defined by the adjacent surfaces of the pattern. Then by use of catalysts, e.g. chlorine and carbon dioxide, and/or the use of heat, the polymerizable binder is caused to polymerize, thereby converting the formed, uncured foundry sand mix into a hard, solid, cured state. This hardening can be accomplished in the original pattern, in a gassing chamber, or in the holding pattern. See U.S. Patents 3,145,438 and 3,121,368, which patents are illustrative of the prior art techniques.

Phenolic resins constitute one of the well-known classes of curable resin compositions used as binders in the foundry art. Both the novolac type of phenol-aldehyde resin and the "resole" or "A-stage" resins have been used in this type of application. Novolac resins are soluble, fusible resins in which the polymer chains have phenolic end-groups. They are traditionally prepared by condensing phenols with aldehydes using acid catalysts and employing a molar excess of phenol over aldehyde. Novolac resins can be cured to insoluble, infusible products by the addition of a source of formaldehyde such as hexamethylenetetramine or paraform. Resole and resitole resins, the latter being the more highly polymerized form of a resole resin, are generally prepared using an alkaline catalyst with excess aldehyde and result in polymers having a highly branched structure and therefore a high concentration of alkylol end-groups. Since each alkylol group constitutes a potential cross-linking site, the resole and resitole resins are readily converted to the cross-linked, infusible polymer by heating. The most commonly used monomers are phenol, i.e. hydroxybenzene, and formaldehyde for both the resole type and the novolac type of resin. Although both the novolac resins and the resole resins have advantages and disadvantages characteristic of their different polymer structure in their application as foundry binders, both are subject to the deficiency of requiring heat in order to achieve the cured foundry form. Frequently, it is necessary to keep the green cores in the original molds or patterns during this heating period since many heat-curable binders do not impart sufficient green strength to cause green cores to retain their desired shapes without external support until such time as a final cure can be effected.

In an effort to prepare cores without the necessity of using heat, various prior attempts have been made to prepare binders which would be capable of curing at room temperature, i.e. at temperatures from about 45–120° F., more usually about 60–90° F. A variety of materials have been developed or suggested for use as binders, but these prior art compositions have suffered from one or more deficiencies. Typical of the deficiencies exhibited by prior art binders alleged to cure at room temperature have been a lack of ability to rapidly impart green strength or stripping strength to cores, a lack of tensile strength, intolerably short bench life of foundry mixes, high toxicity, inability to combine well with all foundry aggregates, high sensitivity to moisture, contamination of the surface of castings, and the creation of pinholes in castings. Although some of the heretofore developed binders capable of curing cores at room temperature, rapidly develop sufficient green strength to allow the removal of the core from the pattern, an additional period of up to 24 hours is frequently required in order to cause the cores to become cured and sufficiently strong to be used in the metal casting process.

It is therefore an object of the present invention to provide binder compositions and methods for curing such binder compositions.

It is an additional object of the present invention to provide binder compositions which are characterized by their ability to rapidly cure at room temperature when used in foundry mixes and which, in addition, exhibit one or more of the following properties:

(a) moisture resistance,
(b) high tensile strength,
(c) adhesion to any aggregate commonly used in the foundry art,
(d) the ability to impart an excellent level of moldability or plasticity to foundry sand mixes containing the novel binder composition,
(e) a realistic bench life which generally is independent of the curing rate, and
(f) the ability to form cores which result in excellent castings by reducing or eliminating the general problems of conventional air-drying binders, surface cracks, and surface contamination.

It is another object of this invention to provide foundry mixes based on the novel binder compositions of the present invention.

It is a further object of the present invention to provide a process for producing cores and other foundry shapes from foundry mixes incorporating the novel binder compositions of the present invention.

Still another object of the present invention is to provide foundry products containing the binder compositions of the present invention in cured form.

Other objects will become apparent from the following description and claims.

Broadly described, the binder compositions of the present invention are phenolic resins dissolved in non-aqueous systems which have been combined with sufficient polyisocyanate to cross-link the phenolic resins and are cured with tertiary amine.

Although it has been known heretofore that isocyanates react with phenolic resins to result in cross-linked materials, heating has generally been employed to cause the isocyanate to react with the phenolic resin either through the phenolic hydroxyl group or through the methylol group in order to achieve the formation of cross-linking urethane bonds. According to the present invention, binder compositions are provided which cure at room temperature.

Phenolic resins have, as indicated above, been widely used as foundry binders. Regardless of whether a resole type of resin or a novolac type of resin is employed, the curing of such resins requires heating. The novolac resins require, in addition, a curing agent, preferably in the form of a formaldehyde source such as hexamethylenetetramine. Considerable heating is required to cause the novolac resins to become cross-linked. The resole resins, on the other hand, although capable of rapid curing at elevated temperatures, are less suitable as binder compositions since they normally contain large quantities of water which can cause the formation of steam blisters, are thermally unstable and have a branched structure which causes them to be relatively insoluble and difficult to apply as a uniform coating on a sand particle. Such uniform coating is necessary in order to obtain even bonding of the aggregate and the formation of cores of acceptable tensile strength.

The use of polyisocyanates alone as a core binder does not result in cores which have sufficient tensile strength to make such cores useful for most industrial applications. Additionally, as the amount of polyisocyanate present in the foundry mix is increased, toxicity is generally believed to increase. Further, as the amount of polyisocyanate in a foundry mix is increased, there is an increasing tendency for castings to contain pinholes. It is generally believed that this pinholing is associated with the amount of nitrogen present in the binder. In the compositions of the present invention, however, the quantity of polyisocyanate is such as to avoid toxicity problems and pinholing problems.

The binder compositions of the present invention are generally made available as a two-package system comprising the resin component in one package and the hardener component in the other package, said resin component comprising an organic solvent solution of a non-aqueous phenolic resin, the said hardener component comprising a liquid polyisocyanate having at least two isocyanate groups per molecule. At the time of use, the contents of the two packages can be combined and then mixed with the sand aggregate or the packages can be sequentially admixed with sand aggregate. After a uniform distribution of the binder on the sand particles has been obtained, the resulting foundry mix is molded into the desired shape. The curing of the molded shape is accomplished by passing a tertiary amine through the molded shape. Employing the binder compositions of the present invention, curing can be accomplished in less than one minute. Since only very small amounts, i.e., catalytic concentrations, of the amine are necessary to accomplish rapid curing, one can, for example, volatilize small quantities of the tertiary amine into an inert gas stream such as nitrogen or air and pass such a stream through the molded shape. Any gas which does not itself enter into the reaction is considered an "inert gas" for the purposes of the present invention. In view of the porous nature of the shaped foundry mix, relatively low gas pressures are necessary to achieve the penetration of the molded shape by the gas.

Any phenolic resin which is substantially free of water and is soluble in an organic solvent can be employed. The term "phenolic resin" as employed herein is meant to define any polymeric condensation product obtained by the reaction of a phenol with an aldehyde. The phenols employed in the formation of the phenolic resin are generally all phenols which have heretofore been employed in the formation of phenolic resins and which are not substituted at either the two ortho-positions or at one ortho- and the para-position, such unsubstituted positions being necessary for the polymerization reaction. Any one, all, or none of the remaining carbon atoms of the phenol ring can be substituted. The nature of the substituent can vary widely and it is only necessary that the substituent not interfere in the polymerization of the aldehyde with the phenol at the ortho-position. Substituted phenols employed in the formation of the phenolic resins include: alkyl-substituted phenols, aryl-substituted phenols, cycloalkyl-substituted phenols, alkenyl-substituted phenols, alkoxy-substituted phenols, aryloxy-substituted phenols, and halogen-substituted phenols, the foregoing substituents containing from 1 to 26 and preferably from 1 to 6 carbon atoms. Specific examples of suitable phenols, aside from the preferred unsubstituted phenol, include: m-cresol, p-cresol, 3,5-xylenol, 3,4-xylenol, 2,3,4-trimethyl phenol, 3-ethyl phenol, 3,5-diethyl phenol, p-butyl phenol, 3,5-dibutyl phenol, p-amyl phenol, p-cyclohexyl phenol, p-octyl phenol, 3,5-dicyclohexyl phenol, p-phenyl phenol, p-crotyl phenol, 3,5-dimethoxy phenol, 3,4,5-trimethoxy phenol, p-ethoxy phenol, p-butoxy phenol, 3-methyl-4-methoxy phenol, and p-phenoxy phenol. Such phenols can be described by the general formula:

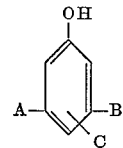

wherein A, B, and C are hydrogen, hydrocarbon radicals, oxyhydrocarbon radicals, or halogen. The preferred phenols are those which are unsubstituted in the para-position as well as in the ortho-positions. The most preferred phenol is the unsubstituted phenol, i.e., hydroxybenzene.

The aldehydes reacted with the phenol can include any of the aldehydes heretofore employed in the formation of phenolic resins such as formaldehyde, acetaldehyde, propionaldehyde, furfuraldehyde, and benzaldehyde. In general, the aldehydes employed have the formula R'CHO wherein R' is a hydrogen or a hydrocarbon radical of 1 to 8 carbon atoms. The most preferred aldehyde is formaldehyde.

The phenolic resins employed in the binder compositions can be either resole or A-stage resins or novolac resins. The resitole or B-stage resins, which are a more highly polymerized form of resole resins, are generally unsuitable. The phenolic resin employed must be liquid or organic solvent-soluble. Solubility in organic solvent is desirable to achieve the uniform distribution of the binder on the aggregate. The substantial absence of water in the phenolic resin is desirable in view of the reactivity of the binder composition of the present invention with water. The term "non-aqueous" or substantially water-free as employed herein is meant to define a phenolic resin which contains less than 5% of water and preferably less than 1% of water based on the weight of the resin.

Although both the resole resins and the novolac resins can be employed in the binder compositions of the present invention, and, when admixed with polyisocyanates and a foundry aggregate and cured by use of tertiary amines form cores of sufficient strength and other properties to be suitable in industrial applications, the novolac resins are preferred over the resole resins. Many resole resins are difficultly soluble in organic solvents and thus do not permit a uniform coating of the aggregate particles.

Furthermore, resole resins are generally prepared in aqueous media and even on dehydration contain 10 or more percent of water. Novolac resins generally have a more linear structure and thus are more readily soulble in organic solvents. Because of their higher molecular weight and absence of methylol groups, novolac resins can, furthermore, be more completely dehydrated. The preferred novolac resins are those in which the phenol is prevailingly polymerized through the two ortho positions. The preparation of novolac resins is known in the art and for that reason not specifically referred to herein.

Particularly preferred phenolic resins are condensation products of a phenol having the general formula:

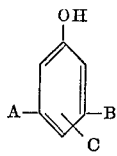

wherein A, B, and C are hydrogen, hydrocarbon radicals, oxyhydrocarbon radicals, or halogen, with an aldehyde having the general formula R'CHO wherein R' is a hydrogen or a hydrocarbon radical of 1 to 8 carbon atoms, prepared in the liquid phase under substantially anhydrous conditions at temperatures below about 130° C. in the presence of catalytic concentrations of a metal ion dissolved in the reaction medium. The preparation and characterization of these resins is disclosed in greater detail in copending application Ser. No. 536,180 filed Mar. 14, 1966. In the preferred form, these resins have the general formula:

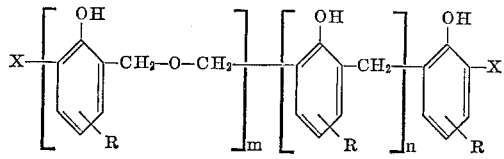

wherein R is a hydrogen or a phenolic substitutent meta to the phenolic hydroxyl group, the sum of $m$ and $n$ is at least 2 and the ratio of $m$-to-$n$ is at least 1, and X is an end-group from the group consisting of hydrogen and methylol, the molar ratio of said methylol-to-hydrogen end-groups being at least 1.

The phenolic resin component of the binder composition is, as indicated above, generally employed as a solution in an organic solvent. The nature and the effect of the solvent will be more specifically described below. The amount of solvent used should be sufficient to result in a binder composition permitting uniform coating thereof on the aggregate and uniform reaction of the mixture. The specific solvent concentrations for the phenolic resins will vary depending on the type of phenolic resins employed and its molecular weight. In general, the solvent concentration will be in the range of up to 80% by weight of the resin solution and preferably in the range of 20 to 80%. It is preferred to keep the viscosity of the first component at less than X—1 on the Gardner-Holt Scale.

The second component or package of the novel binder composition comprises an aliphatic, cycloaliphatic, or aromatic polyisocyanate having preferably from 2 to 5 isocyanate groups. If desired, mixtures of polyisocyanates can be employed. Less preferably, isocyanate prepolymers formed by reacting excess polyisocyanate with a polyhydric alcohol, e.g. a prepolymer of toluene diisocyanate and ethylene glycol, can be employed. Suitable polyisocyanates include the aliphatic polyisocyanates such as hexamethylene diisocyanate, alicyclic polyisocyanates such as 4,4'-dicyclohexylmethane diisocyanate, and aromatic polyisocyanates such as 2,4'- and 2,6-toluene diisocyanate, diphenylmethyl diisocyanate, and the dimethyl derivatives thereof. Further examples of suitable polyisocyanates are 1,5 - naphthalene diisocyanate, triphenylmethane triisocyanate, xylylene diisocyanate, and the methyl derivatives thereof, polymethylenepolyphenol isocyanates, chlorophenylene-2,4-diisocyanate, and the like. Although all polyisocyanates react with the phenolic resin to form a cross-linked polymer structure, the preferred polyisocyanates are aromatic polyisocyanates and particularly diphenylmethane diisocyanate, triphenylmethane triisocyanate, and mixtures thereof.

The polyisocyanate is employed in sufficient concentrations to cause the curing of the phenolic resin. In general, the polyisocyanate will be employed in a range of 10 to 500 weight percent of polyisocyanate based on the weight of the phenolic resin. Preferably, from 20 to 300 weight percent of polyisocyanate on the same basis is employed. The polyisocyanate is employed in liquid form. Liquid polyisocyanates can be employed in undiluted form. Solid or viscous polyisocyanates are employed in the form of organic solvent solutions, the solvent being present in a range of up to 80% by weight of the solution.

Although the solvent employed in combination with either the phenolic resin or the polyisocyanate or for both components does not enter to any significant degree into the reaction between the isocyanate and the phenolic resin in the presence of the curing agent, it can affect the reaction. Thus the difference in the polarity between the polyisocyanate and the phenolic resins restricts the choice of solvents in which both components are compatible. Such compatibility is necessary to achieve complete reaction and curing of the binder compositions of the present invention. Polar solvents of either the protic or aprotic type are good solvents for the phenolic resin, but have limited compatibility with the polyisocyanates. Aromatic solvents, although compatible with the polyisocyanates, are less compatible with the phenolic resins. It is therefore preferred to employ combinations of solvents and particularly combinations of aromatic and polar solvents. Suitable aromatic solvents are benzene, toluene, xylene, ethylbenzene, and mixtures thereof. Preferred aromatic solvents are mixed solvents that have an aromatic content of at least 90% and a boiling point range within a range of 280° to 450° F. The polar solvents should not be extremely polar such as to become incompatible with the aromatic solvent. Suitable polar solvents are generally those which have been classified in the art as coupling solvents and include furfural, furfuryl alcohol, Cellosolve acetate, butyl Cellosolve, butyl Carbitol, diacetone alcohol, and "Texanol." Furfuryl alcohol is particularly preferred.

The binder components are combined and then admixed with sand or a similar foundry aggregate to form the foundry mix or the foundry mix can also be formed by sequentially admixing the components with the aggregate. Methods of distributing the binder on the aggregate particles are well-known to those skilled in the art. The foundry mix can, optionally, contain other ingredients such as iron oxide, ground flax fibers, wood cereals, pitch, refractory flours, and the like.

A valuable additive to the binder compositions of the present invention in certain types of sand is a silane having the general formula:

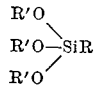

wherein R' is a hydrocarbon radical and preferably an alkyl radical of 1 to 6 carbon atoms and R is an alkyl radical, an alkoxy-substituted alkyl radical, or an alkylamino-substituted alkyl radical in which the alkyl groups have from 1 to 6 carbon atoms. The aforesaid silane, when employed in concentrations of 0.1 to 2% based on the phenolic binder and hardener, improves the adhesion of the phenolic binder to the foundry aggregate particle.

The aggregate, e.g. sand, is usually the major constituent and the binder portion constitutes a relatively minor amount, generally less than 100%, frequently within the range of 0.25 to about 5%, these figures being based on the weight of the aggregate. Although the sand employed is preferably dry sand, moisture of up to about 1 weight percent based on the weight of the sand can be tolerated. This is particularly true if the solvent employed is non-water-miscible or if an excess of the polyisocyanate necessary for curing is employed, since such excess polyisocyanate will react with the water.

The resulting foundry mix is then molded into the desired core or shape, whereupon it can be cured rapidly by contacting with the tertiary amine. The actual curing step can be accomplished by suspending a tertiary amine in an inert gas stream and passing the gas stream containing the tertiary amine, under sufficient pressure to penetrate the molded shape, through the mold until the resin has been cured. The binder compositions of the present invention require exceedingly short curing times to achieve acceptable tensile strengths, an attribute of extreme commercial importance. Optimum curing times are readily established experimentally. Since only catalytic concentrations of the tertiary amine are necessary to cause curing, a very dilute stream is generally sufficient to accomplish the curing. However, excess concentrations of the tertiary amine beyond that necessary to cause curing are not deleterious to the resulting cured product. Inert gas streams, e.g. air or nitrogen, containing from 0.01 to 5% by volume of tertiary amine can be employed. Normally gaseous tertiary amines can be passed through the mold as such or in dilute form. Suitable tertiary amines are gaseous tertiary amines such as trimethyl amine. However, normally liquid tertiary amines such as triethyl amine are equally suitable in volatile form or if suspended in a gaseous medium and then passed through the mold. Although ammonia, primary amines and secondary amines exhibit some activity in causing a room temperature reaction, they are considerably inferior to the tertiary amines. Functionally, substituted amines such as dimethyl ethanol amine are included within the scope of tertiary amines and can be employed as curing agents. Functional groups which do not interfere in the action of the tertiary amine are hydroxyl groups, alkoxy groups, amino and alkyl amino groups, ketoxy groups, thio groups, and the like.

The binder compositions of the present invention have been principally defined and illustrated in terms of their use in the foundry art. Although the binder compositions are particularly suited for this application, the binders can also be employed in such applications as adhesives and coatings. In these applications, it is generally desirable to employ an amine such as pyridine or an amine oxide, which similarly catalyze the reaction between the phenolic resin and the polyisocyanate, although at a reduced rate which thereby allows their incorporation in the composition. The process in which the binders of the present invention are employed is believed to be novel and not necessarily limited to the described phenolic resins. Thus other hydroxyl group-containing resins such as copolymers of styrene and allyl alcohol result in foundry shapes containing a cured binder when employed in the process described in place of the phenolic resins. However, far superior properties are obtained when the described phenolic resins are employed.

The present invention is further illustrated by the following examples in which all parts and percentages are by weight unless otherwise indicated.

EXAMPLES 1 TO 20

Foundry sand mixes were prepared by admixing 20 parts of the phenolic resins further identified below, 20 parts of butyl acetate and the below-indicated amount of a mixture of di- and triphenylmethane, di- and triisocyanate commercially available as "Mondur MR" until uniform, and thereafter admixing the resulting binder with 2,000 parts of silica sand until the binder was evenly distributed on the sand particles.

The resulting foundry sand mixes were then formed into standard AFS tensile test samples using the standard procedure. The resulting test samples were then cured by treatment with triethyl amine. In treating the samples with triethyl amine, an air stream was bubbled through the liquid triethyl amine and then passed through the test samples for a period of 60 seconds.

The cured samples were then stored in either a dry atmosphere or in an atmosphere of 100% relative humidity for a period of 2 hours before the tensile strength was measured.

The following phenolic resins were employed.

*Resin A.*—This resin was obtained by charging to a reflux system 720 g. of paraformaldehyde, 1014 g. of phenol, 15 g. of zinc naphthenate solution (8%), and 120 ml. of benzene. The system was heated to reflux (103° C. to 126° C.). After three hours, during which water and benzene were distilled off, 150 ml. of diethylene glycol dimethyl ether and 10 ml. of benzene were added. An additional 150 ml. of the ether were added after one further hour of refluxing. After five hours, 600 ml. of tetrahydrofuran were added to dilute the resin system. A total of 310 g. of water was distilled over. The resin and the solvent weighed 2520 g., and the resin was found to be a benzylic ether type of phenolic resin.

*Resin B.*—The procedure employed for Resin A was repeated except that 15 g. of lead naphthenate solution (24%) instead of the zinc naphthenate solution was employed. The reflux was continued for six hours at a temperature of 105° C. to 125° C. without the addition of the ether. A total of 298 ml. of water was distilled over. To the resin was added 100 ml. of benzene during the reflux, and 575 ml. of isopropanol at the end of the reflux. This resin was found to be a benzylic ether type of phenolic resin having a lower molecular weight than Resin A.

*Resin C.*—This resin was obtained by charging 292 g. of phenol, 63 g. of paraform, 2 g. of zinc naphthenate, and 100 g. of toluene. The reaction mixture was refluxed at 258° F. to 266° F. for a period of 6.5 hours and then heated to 380° F. The resulting resin was an o-o-phenol formaldehyde resin of the novolac type.

*Resin D.*—A commercially available (Synco 2898C) acid-catalzed phenol formaldehyde, novolac type resin.

*Resin E.*—A commercially available (Synco 640) oil reactive novolac type resin obtained for p-t-butylphenol and formaldehyde.

The results are illustrated in the following Table I.

TABLE I

| Example | Resin | Isocyanate Content in parts | Exposure | Tensile Strength in p.s.i. |
|---|---|---|---|---|
| 1 | A | 20 | Dry | 320 |
| 2 | A | 20 | 100% R.H. | 30 |
| 3 | A | 10 | Dry | 220 |
| 4 | A | 10 | 100% R.H. | 30 |
| 5 | B | 20 | Dry | 340 |
| 6 | B | 20 | 100% R.H. | 20 |
| 7 | B | 10 | Dry | 220 |
| 8 | B | 10 | 100% R.H. | 20 |
| 9 | C | 70 | Dry | 290 |
| 10 | C | 20 | 100% R.H. | 10 |
| 11 | C | 10 | Dry | 70 |
| 12 | C | 10 | 100% R.H. | 45 |
| 13 | D | 20 | Dry | 250 |
| 14 | D | 20 | 100% R.H. | 35 |
| 15 | D | 10 | Dry | 140 |
| 16 | D | 10 | 100% R.H. | 20 |
| 17 | E | 20 | Dry | 260 |
| 18 | E | 20 | 100% R.H. | 10 |
| 19 | E | 10 | Dry | 90 |
| 20 | E | 10 | 100% R.H. | 2 |

EXAMPLES 21 TO 29

The procedures of Examples 1 to 20 were repeated except that 1% of a silane having the formula $H_2N-CH_2-CH_2-NH(CH_2)_3-Si-(OCH_3)_3$ was added to the binder. The following results were obtained.

TABLE II

| Example | Resin | Isocyanate Content in parts | Exposure | Tensile Strength in p.s.i. |
|---|---|---|---|---|
| 21 | B | 20 | Dry | 520 |
| 22 | B | 20 | 100% R.H. | 430 |
| 23 | B | 10 | Dry | 320 |
| 24 | B | 10 | 100% R.H. | 240 |
| 25 | B | 5 | Dry | 220 |
| 26 | B | 5 | 100% R.H. | 300 |
| 27 | D | 10 | 100% R.H. | 230 |
| 28 | D | 5 | Dry | 190 |
| 29 | D | 5 | 100% R.H. | 180 |

EXAMPLE 30

The procedure of Examples 1 to 20 was repeated using Resin B, 20 parts of the polyisocyanate, triethyl amine, and a gas cure time of 90 seconds. Tensile strength of the test bar was 390 p.s.i. In a modification of this procedure, the test bar was cured by bubbling air through diethyl amine. The resulting test bar had a tensile strength of 20 p.s.i. In a third modification, the tensile bar was cured by blowing NH₃ through the bar. The resulting bar had a tensile strength of 60 p.s.i.

EXAMPLE 31

The procedure of Examples 1 to 20 was repeated employing instead of the "Mondur MR" polyisocyanate, a polymethylene polyphenyl isocyanate commercially available as "Papi." The test bars were cured by treatment with triethyl amine, as described. Employing 20 parts of the polyisocyanate, a tensile strength on curing of 320 p.s.i. was obtained. Employing 10 parts of the polyisocyanate, the tensile strength of the gas cured test bar was 250 p.s.i.

EXAMPLES 32 TO 39

Into a sealed kettle was charged 62.5 lbs. of phenol, 46.5 lbs. of paraformaldehyde, 0.95 lb. of a 24% solution of lead naphthenate in toluene, and 4 lbs. of toluene. The vessel was sealed and heated to temperatures of 100° to 125° C. for a period of 3 hours. During this heating period the pressure was maintained at 2 to 4 p.s.i., and steam released from the vessel as pressure increased. Some toluene distilled out with the steam. A total of 24 lbs. of water was removed. After three hours, a vacuum was pulled on the reaction mixture to remove all the toluene originally added and 36.5 lbs. of furfuryl alcohol was added to the 116 lbs. of resin obtained. The resin was of the benzylic ether type.

The resin was diluted with solvents as indicated in Table III, below, under "Part A," and admixed with 5,000 parts of sand in a Hobart mixer for a period of two minutes. To the resulting sand mixture was then added "Mondur MR" in the amounts indicated dissolved in the solvents shown in "Part B." The mixture was agitated for another two minutes and then blown into a "Redford" former at a pressure of 100 p.s.i. to form core test samples. As soon as the samples had been formed they were gassed by passing nitrogen at a pressure of about 81 p.s.i. through liquid triethyl amine and thereafter charging it to the core samples at a pressure of about 20 to 40 p.s.i. through the blow holes. The samples were gassed for 10 seconds and permitted to remain in the sample-forming machine for an additional one minute before removal.

Some of the samples, on gassing, were baked at 375° F. for 15 minutes, and of these some were exposed for two hours at 100% relative humidity at room temperature. Tensile strength measurements on all three types of samples were made, and are shown in the following Table III.

TABLE III

| Example | Formulation (in parts) | | | | | | Tensile Strength (in p.s.i.) | | |
|---|---|---|---|---|---|---|---|---|---|
| | Part A | | | Part B | | | Gassed | Gassed and Baked | Gassed, Baked and Exposed |
| | Resin | Furfuryl Alcohol | Furfural | Furfural | Aromatic Solvent [1] | Mondur MR | | | |
| 32 | 17.5 | 7.5 | | 5 | 19.8 | 25.2 | 260 | 430 | 185 |
| 33 | 17.5 | 7.5 | | 5 | 22.6 | 23 | 220 | 380 | 190 |
| 34 | 17.5 | 7.5 | | 5 | 25.4 | 19.6 | 195 | 330 | 160 |
| 35 | 17.5 | 7.5 | | | 22 | 28 | 320 | 450 | 180 |
| 36 | 17.5 | 7.5 | | | 20 | 30 | 325 | 490 | 200 |
| 37 | 17.5 | 3.3 | 4.3 | | 22 | 28 | 335 | 495 | 275 |
| 38 [2] | 17.5 | 7.5 | 5 | | 20 | 25 | 280 | 440 | 200 |
| 39 | 15.8 | 6.8+ | 5 | | 22.5 | 25 | 295 | 440 | 250 |

[1] Commercially available as "Solvesso-100."
[2] Instead of "Mondur MR" another polyisocyanate, commercially available as "Kaiser NCO-120," was employed.

EXAMPLE 40

The procedure of Example 36 was repeated using the following commercially available polyisocyanates: "Baymidur K-88," "Suprasec DN," "PAPI," "Desmodur 44V," "Kaiser NCO-120," and "Carwinate 390 P." In all instances the tensile strengths of the samples were in the range of 250 to 350 p.s.i.

EXAMPLES 41 TO 45

Employing the procedure of Examples 31 to 39, different types of phenolic resins were evaluated. The following resins were employed.

*Resin A.*—A benzoic acid catalyzed novolac resin prepared with aqueous formaldehyde at a formaldehyde to phenol mole ratio of 0.8.

*Resin B.*—A zinc borate catalyzed novolac resin prepared with aqueous formaldehyde at a formaldehyde to phenol mole ratio of 0.8.

*Resin C.*—A low molecular weight acid catalyzed novolac resin in which the acid had been neutralized.

*Resin D.*—An acid catalyzed novolac resin in which the acid had been neutralized, prepared at low formaldehyde to phenol ratios.

*Resin E.*—Benzylic ether resin prepared substantially as described in Examples 32 to 39.

The foundry aggregates were prepared as described in Examples 32 to 39, using the solvents indicated in Table IV. The aggregates were then permitted to stand for 10 and 60 minutes respectively before gassing. Those samples which were baked after gassing were directly blown and gassed without any delay subsequent to mixing. The samples were otherwise prepared as described in Examples 32 to 39, and their tensile strengths determined.

TABLE IV

| Example | Resin | Formulation (parts/5,000 parts of sand) | | | | | Tensile Strength (p.s.i.) | | | |
|---|---|---|---|---|---|---|---|---|---|---|
| | | Part A | | | | Part B | Gassing after 10 mins. | Gassing after 60 mins. | Gassing and Baking | Gassing, Baking and Exposing |
| | | Resin | Butyl Cellosolve | Furfural | Aromatic solvent [1] | "Mondur MR" | | | | |
| 41 | A | 19.5 | [2] 8.5 | | 22 | 25 | 110 | 40 | 370 | 200 |
| 42 | B | 17 | [2] 7 | | 19 | 25 | 70 | 120 | 300 | 60 |
| 43 | C | 17.6 | 7.5 | 7 | [3] 9.3 | 28 | 160 | 140 | 230 | 40 |
| 44 | D | 17.6 | 7.5 | 5 | [3] 9.3 | 28 | 180 | 130 | 210 | 60 |
| 45 | E | 17.5 | [2] 7.5 | | 22 | 28 | 320 | 290 | 480 | 200 |

[1] "Solvesso-100."
[2] Furfuryl alcohol instead of Butyl Cellosolve.
[3] Hexylacetate instead of "Solvesso-100."

What is claimed is:

1. A binder composition comprising in admixture a resin component, a hardener component, and a curing agent, said resin component comprising an organic solvent solution of a non-aqueous phenolic resin which comprises a condensation product of a phenol having the general formula:

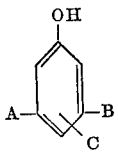

wherein A, B, and C are hydrogen, hydrocarbon radicals, oxyhydrocarbon radicals or halogen, with an aldehyde having the general formula R'CHO wherein R' is a hydrogen or a hydrocarbon radical of 1 to 8 carbon atoms; said hardener component comprising liquid polyisocyanate containing at least two isocyanate groups; and a curing agent comprising a tertiary amine.

2. The binder composition of claim 1, wherein the aldehyde is formaldehyde.

3. The binder composition of claim 1, wherein the aldehyde is formaldehyde, and A and B are hydrogen, and C is a hydrocarbon radical.

4. The binder composition of claim 1, wherein the aldehyde is formaldehyde and A, B, and C are hydrogen.

5. The binder composition of claim 1, wherein the phenolic resin is a novolac resin.

6. The binder composition of claim 1, wherein the phenolic resin has the general formula:

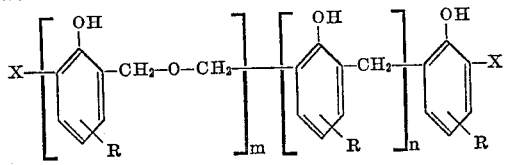

wherein R is hydrogen or a phenolic substituent meta to the hydroxyl group of the phenol, $m$ and $n$ are numbers the sum of which is at least 2, and the ratio of $m$-to-$n$ is at least 1, and X is a hydrogen or a methylol group, the molar ratio of said methylol group-to-hydrogen being at least 1.

7. The binder composition of claim 6, wherein R is hydrogen.

8. The binder composition of claim 1, wherein the polyisocyanate is an aromatic polyisocyanate.

9. The binder composition of claim 8, wherein the aromatic polyisocyanate is diphenylmethane diisocyanate.

10. The binder composition of claim 6, wherein the polyisocyanate is an aromatic polyisocyanate.

11. The binder composition of claim 1, wherein the solvent is a mixture of an aromatic solvent and a polar solvent.

12. The binder composition of claim 11, wherein the polar solvent is furfural, furfuryl alcohol, Cellosolve acetate, butyl Cellosolve, butyl Carbitol, diacetone alcohol or mixtures thereof.

13. A foundry mix containing sand as the major constituent and a binding amount of up to 10% based on the weight of sand of the binder of claim 1.

14. A foundry mix containing sand as the major constituent and a binding amount of up to 10% based on the weight of sand of the binder of claim 6.

15. The process of preparing shaped foundry products which comprises:
  (a) forming a foundry mix by uniformly distributing on a foundry aggregate containing sand as the major constituent a binding amount of up to 10% based on the weight of the aggregate of a binder composition obtained by combining the phenolic resin component and hardener component of claim 1, said polyisocyanate being employed in a concentration of 10 to 500% by weight of the phenolic resin;
  (b) shaping the foundry mix in a mold; and
  (c) contacting the shaped foundry mix with a tertiary amine until the binder has cured.

16. The process of claim 15, wherein the tertiary amine is passed through the shaped foundry mix in gaseous form.

17. The process of claim 15, wherein the tertiary amine is gaseous at room temperature.

18. The process of claim 15, wherein the tertiary amine is suspended in an inert gas stream which is passed through the shaped foundry mix.

19. The process of claim 15, wherein the resin component of the binder is the phenolic resin of claim 6.

20. The process of claim 19, wherein the polyisocyanate is an aromatic polyisocyanate.

21. The process of claim 17, wherein the tertiary amine is trimethyl amine or triethyl amine.

22. The process of claim 15, wherein the foundry mix is prepared by admixing the foundry aggregate with the phenolic resin component and thereafter admixing the resulting mixture with the hardener component.

References Cited

UNITED STATES PATENTS

| | | | |
|---|---|---|---|
| 2,151,975 | 3/1939 | Kline | 260—59 |
| 2,374,136 | 11/1940 | Rothrock. | |
| 3,141,005 | 6/1964 | Noll | 260—59 |
| 3,278,637 | 10/1966 | Kirkpatrick | 260—59 |
| 3,352,813 | 11/1967 | Hayes | 260—59 |

OTHER REFERENCES

Doolittle: "Technology of Solvents and Plasticizers," John Wiley & Sons, copy group 145, p. 596, 1962.

MORRIS LIEBMAN, Primary Examiner.

R. S. BARON, Assistant Examiner.

UNITED STATES PATENT OFFICE
CERTIFICATE OF CORRECTION

Patent No. 3,409,579                                                    November 5, 1968

Janis Robins

It is certified that error appears in the above identified patent and that said Letters Patent are hereby corrected as shown below:

Column 7, line 1, "100%" should read -- 10% --. Columns 9 and 10, TABLE III, third column, line 8 thereof, "6.8+" should read -- 6.8 --. Column 10, line 46, "Kaiser NCO-120" should read -- Kaiser NCO-20 --.

Signed and sealed this 9th day of June 1970.

(SEAL)
Attest:

Edward M. Fletcher, Jr.
Attesting Officer

WILLIAM E. SCHUYLER, JR.
Commissioner of Patents